US011328611B2

(12) United States Patent
Shannon

(10) Patent No.: US 11,328,611 B2
(45) Date of Patent: *May 10, 2022

(54) VERTIPORT MANAGEMENT PLATFORM

(71) Applicant: Peter F. Shannon, San Francisco, CA (US)

(72) Inventor: Peter F. Shannon, San Francisco, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/799,177

(22) Filed: Feb. 24, 2020

(65) Prior Publication Data

US 2020/0193847 A1 Jun. 18, 2020

Related U.S. Application Data

(63) Continuation-in-part of application No. 16/366,171, filed on Mar. 27, 2019, now Pat. No. 10,593,217, (Continued)

(51) Int. Cl.
*G08G 5/00* (2006.01)
*B64C 29/00* (2006.01)
(Continued)

(52) U.S. Cl.
CPC ........... *G08G 5/0043* (2013.01); *B64C 29/00* (2013.01); *G06Q 10/06314* (2013.01);
(Continued)

(58) Field of Classification Search
USPC ........................................................ 701/120
See application file for complete search history.

(56) References Cited

U.S. PATENT DOCUMENTS 4,989,084 A 1/1991 Wetzel
10,593,217 B2 * 3/2020 Shannon ................ G08G 5/006
(Continued)

FOREIGN PATENT DOCUMENTS

EP 2 963 519 A1 1/2016

OTHER PUBLICATIONS

Uber, "Fast-Forwarding to a Future of On-Demand Urban Air Transportation", retrieved from the internet: https://www.uber.com/elevate.pdf; pp. 1-97, (Oct. 27, 2016).
(Continued)

*Primary Examiner* — Tyler D Paige
(74) *Attorney, Agent, or Firm* — The Marbury Law Group, PLLC

(57) ABSTRACT

Systems, methods, and devices of the various embodiments enable a vertiport management platform for various aerial on demand mobility (ODM) stakeholders, including vertiport owners/operators, mobility service providers, aircraft fleet operators (e.g., electric vertical takeoff and landing (eV-TOL) fleet operators, etc.), etc., to coordinate activities related to vertiports. Various embodiments enable vertiport capacity and ground operation coordination among aerial ODM stakeholders. Vertiport management platforms according to the various embodiments may support all aspects of aerial ODM services. Vertiport management platforms according to the various embodiments may enable flight operations at and between vertiports regardless as to the mobility service provider and/or customer facing network under which a flight is provided to a customer.

20 Claims, 8 Drawing Sheets

Related U.S. Application Data which is a continuation of application No. PCT/US2018/058332, filed on Oct. 31, 2018.

(60) Provisional application No. 62/580,833, filed on Nov. 2, 2017.

(51) Int. Cl.
*G06Q 10/06* (2012.01)
*H04L 67/12* (2022.01)

(52) U.S. Cl.
CPC ............ *G08G 5/003* (2013.01); *G08G 5/0017* (2013.01); *H04L 67/12* (2013.01)

(56) References Cited

U.S. PATENT DOCUMENTS

| | | |
|---|---|---|
| 2002/0194113 A1 | 12/2002 | Lof et al. |
| 2003/0139875 A1 | 7/2003 | Baiada et al. |
| 2004/0111197 A1 | 6/2004 | Kipersztok et al. |
| 2009/0119135 A1* | 5/2009 | Schoeman ............. G06Q 10/02 705/5 |
| 2012/0233246 A1 | 9/2012 | Guemez |
| 2014/0018979 A1 | 1/2014 | Goossen et al. |
| 2014/0317927 A1* | 10/2014 | Westergaard ........... F03D 13/10 29/889.21 |
| 2017/0073085 A1 | 3/2017 | Tremblay et al. |
| 2017/0124489 A1* | 5/2017 | Leavitt ................... G06Q 50/30 |
| 2017/0197710 A1* | 7/2017 | Ma ....................... B64C 29/0025 |
| 2017/0268891 A1 | 9/2017 | Dyrnaes et al. |
| 2018/0174265 A1* | 6/2018 | Liu ..................... G06Q 30/0639 |
| 2018/0270610 A1* | 9/2018 | Song ...................... G06Q 50/30 |
| 2018/0334251 A1 | 11/2018 | Karem et al. |
| 2019/0221127 A1* | 7/2019 | Shannon .............. G08G 5/0091 |
| 2019/0340933 A1* | 11/2019 | Villa .................... G08G 5/0034 |
| 2020/0193847 A1* | 6/2020 | Shannon .......... G06Q 10/06314 |

OTHER PUBLICATIONS

International Search Report and Written Opinion from the the International Searching Authority in Application No. PCT/US18/58332 dated Jan. 7, 2019.

International Preliminary Report on Patentability (Chapter 1 of the Patent Cooperation Treaty) in related International Application No. PCT/US2018/058332 dated May 14, 2020.

European Search Report received in related Application No. 18872064.3-1203 / 3704685 in PCT Application No. PCT/US2018/058332 dated Jul. 14, 2021.

Communication pursuant to Rules 70(2) and 70a(2)EPC received in related Application No. 18872064.3-1203 / 3704685 in PCT Application No. PCT/US2018/058332 dated Aug. 3, 2021.

* cited by examiner

VERTIPORT MANAGEMENT PLATFORM

RELATED APPLICATIONS

This application is a continuation-in-part of, and claims priority to, U.S. Non-Provisional application Ser. No. 16/366,171 entitled "Vertiport Management Platform," filed Mar. 27, 2019 that is a bypass continuation of, and claims priority to, International Application PCT/US2018/058332 entitled "Vertiport Management Platform," filed Oct. 31, 2018 which claims the benefit of priority to U.S. Provisional Patent Application 62/580,833 entitled "Vertiport Management Platform," filed Nov. 2, 2017. The entire contents of all three applications are hereby incorporated by reference for all purposes.

BACKGROUND

The fundamentals of aerial on demand mobility (ODM) networks differ from existing terrestrial transportation networks (e.g., road based ODM networks operated by mobility service providers, such as Uber®, Lyft®, etc.) in several ways. Additionally, the fundamentals of aerial ODM networks differ from commercial airline transportation networks (e.g., services provided from metropolitan or regional airports, such as Delta® flights, JetBlue® flights, etc.) in several ways.

Aerial ODM flight schedules are by nature dynamic and evolve in real-time and the smaller scale of vertiports requires precise use of resources without high overhead. Additionally, aerial ODM may present challenges in that there can be both cooperative and competitive dynamics between the aerial ODM stakeholders, such as vertiport owner/operators, mobility service providers, and aircraft fleet operators (e.g., electric vertical takeoff and landing (eVTOL) fleet operators). For an aerial ODM network to work for aerial ODM stakeholders, coordination of capacity and ground operations at all vertiports that aircraft fly between is needed.

SUMMARY

The systems, methods, and devices of the various embodiments enable a vertiport management platform for various aerial on demand mobility (ODM) stakeholders, including vertiport owners/operators, mobility service providers, aircraft fleet operators (e.g., electric vertical takeoff and landing (eVTOL) fleet operators, etc.), etc., to coordinate activities related to vertiports. Various embodiments enable vertiport capacity and ground operation coordination among aerial ODM stakeholders. Vertiport management platforms according to the various embodiments may support all aspects of aerial ODM services. Vertiport management platforms according to the various embodiments may enable flight operations at, and between, vertiports without regard to the mobility service provider and/or customer facing network under which a flight is provided to a customer.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
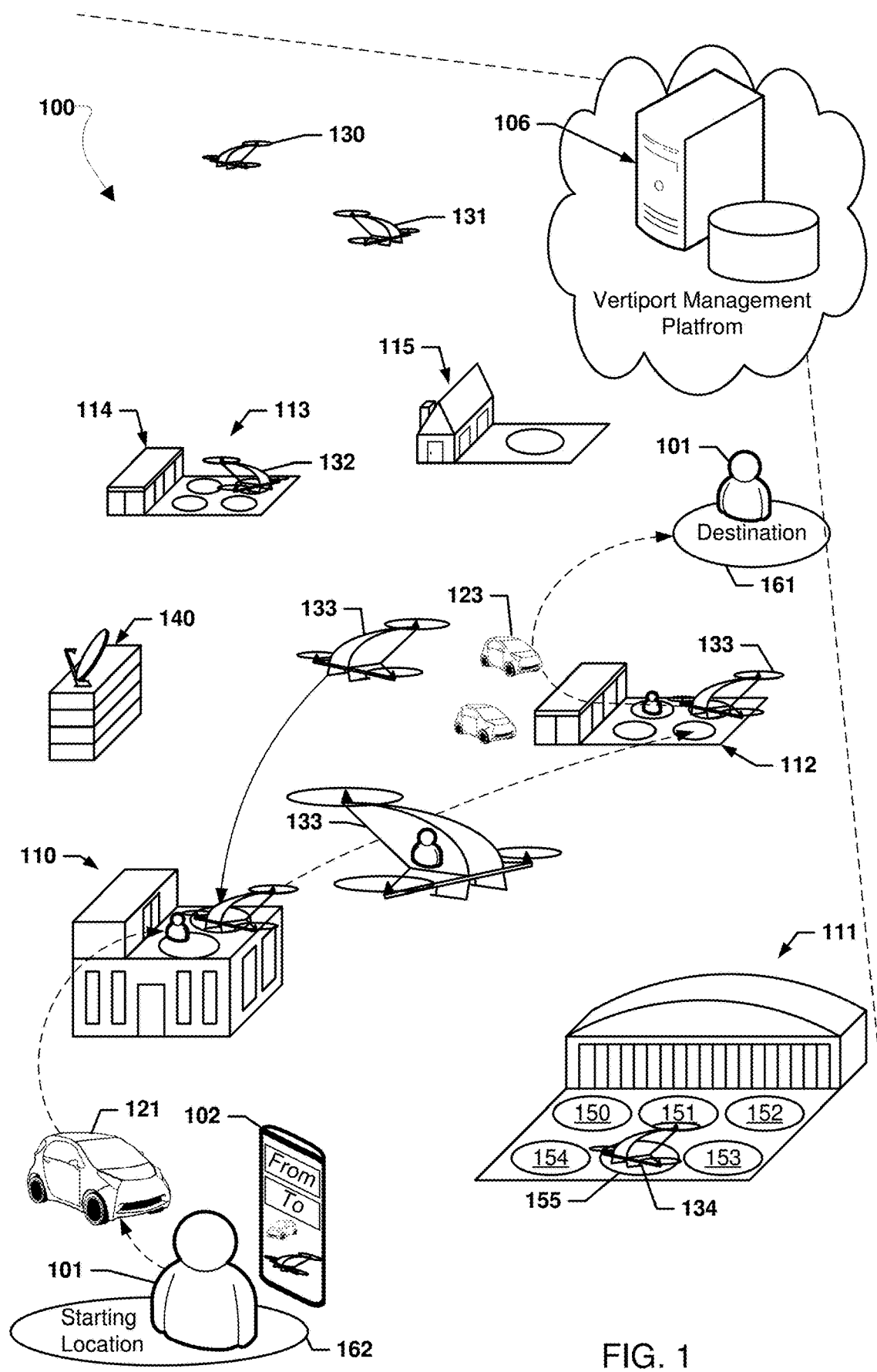
FIG. 1 is a system block diagram of an aerial ODM network supported by a vertiport management platform according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "vertiport" is used to refer to any location configured to provide landing and takeoff space to a vertical takeoff and landing (VTOL) aircraft, such as an electric VTOL (eVTOL) aircraft and to enable customers/passengers and/or cargo (e.g., packages, boxes, parts, containers, etc.) to be embarked on and/or debarked from the VTOL aircraft. Vertiports may be structures or portions of structures entirely dedicated to flight operations, such as an airfield, an airport, a specifically built vertiport building including one or more VTOL aircraft landing spaces, a customer/passenger lounge area, a cargo staging area, etc., and/or vertiports may be structures or portions of structures only partially dedicated to flight operations, such as roof of a shopping center or parking garage including one or more VTOL aircraft landing spaces and a customer/passenger lounge area, a space within the loops of a highway cloverleaf, a converted parking lot, etc. Vertiports may be temporary, such as a structures or portions of structures used part of the time for flight operations and part of the time for non-flight operations. For example, vertiports may be implemented in dual-use structures (e.g., parking lots or parking garages) or real estate (e.g., baseball, soccer or football fields) that are used part of the time for flight operations and part of the time for their normal or designated purpose. Vertiports may be privately owned, developed, and/or managed locations. Vertiports may be publicly owned, developed, and/or managed locations, such as transit hubs, airports, etc. Vertiports may also be public-private ventures. Vertiports may have a small scale and throughput when compared with regional airports. For example, some vertiports may have space for a limited number of VTOL aircraft to land and/or otherwise operate at a time, such as one, two, three, four, five, or six landing spots, and some vertiports may not provide hangar or other long term storage and maintenance space to VTOL aircraft. Vertiports may provide various support and maintenance services to VTOL aircraft, such as refueling services to combustion engine VTOL aircraft, re-charging services to eVTOL aircraft, etc.

As used herein, the term "computing device" is used to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), and similar personal electronic devices which include a programmable processor and memory and circuitry to provide the functionality described herein.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

The fundamentals of aerial on demand mobility (ODM) networks differ from existing terrestrial transportation networks (e.g., road based ODM networks operated by mobility service providers, such as Uber®, Lyft®, etc.) in several ways. As an example, all that is typically needed for road based ODM passenger/customer/cargo pick-up/drop-off is curb space which is nearly everywhere a passenger/customer/cargo may be located and/or desires to travel to, is generally public property and free to use, and provides a high capacity for passenger/customer/cargo pick-ups/drop-offs. Conversely, aerial ODM may require vertiports for passenger/customer/cargo pick-up/drop-off which are generally in limited locations, may be on private property, and may have limited capacity for passenger/customer/cargo pick-ups/drop-offs.

Additionally, the fundamentals of aerial ODM networks differ from commercial airline transportation networks (e.g., services provided from metropolitan or regional airports, such as Delta® flights, JetBlue® flights, etc.) in several ways. As an example, commercial airline transportation networks typically fly from regional airports, which are typically in one or two locations in a metropolitan area, are expensive public infrastructure projects, have varying utilization rates, and have large scale passenger/customer and flight throughputs. Commercial airline transportation networks typically schedule flights months in advance and are supported by professional management and planning operations. Conversely, aerial ODM networks may fly from vertiports that are numerous throughout a metropolitan area, are generally private and inexpensive to build and operate, and require a high flight throughput to be economically viable. Aerial ODM flight schedules are by nature dynamic and evolve in real-time and the smaller scale of vertiports requires precise use of resources without high overhead.

Aerial ODM may present challenges in that there can be both cooperative and competitive dynamics between the aerial ODM stakeholders, such as vertiport owner/operators, mobility service providers, and aircraft fleet operators (e.g., electric vertical takeoff and landing (eVTOL) fleet operators). For example, vertiport owner/operators need to design and locate their vertiports to be desirable to mobility service providers and aircraft fleet operators so as to ensure usage of the vertiports by both the customers/passengers of mobility service providers and pilots of aircraft fleet operators. As another example, mobility service providers need to schedule flights from vertiports that enable aircraft of aircraft fleet operators to receive necessary services (e.g., charging, etc.) at certain periodicities. As a further example, should fees for use of vertiports become too high, mobility service providers and/or aircraft fleet operators may be incentivized to build and operate their own vertiports. For an aerial ODM network to work for aerial ODM stakeholders, coordination of capacity and ground operations at all vertiports that VTOL aircraft fly between is needed.

The systems, methods, and devices of the various embodiments enable a vertiport management platform for various aerial ODM stakeholders, including vertiport owners/operators, mobility service providers, aircraft fleet operators (e.g., electric vertical takeoff and landing (eVTOL) fleet operators)(aircraft fleet operators may include organizations operating multiple aircraft or an individual operating a single aircraft), service providers (e.g., electric charging, maintenance, etc.), etc., to coordinate activities related to vertiports. Vertiport management platforms according to the various embodiments may both coordinate physical operations in aerial ODM networks (e.g., aircraft, cargo, and passenger movement, etc.) and coordinate marketplace activities in aerial ODM networks (e.g., payments, bidding, etc.) Various embodiments enable vertiport capacity and ground operation coordination among aerial ODM stakeholders. Vertiport management platforms according to the various embodiments may support all aspects of aerial ODM services and vertiport management platforms according to the various embodiments may provide market-making functions and services for aerial ODM. Vertiport management platforms according to the various embodiments may enable flight operations at and between vertiports without regard to the mobility service provider and/or customer facing network under which a flight is provided to a customer or for a customer's cargo.

The systems, methods, and devices of the various embodiments may provide a vertiport management platform that may autonomously manage capacity of take-off and landing spots across all vertiports in an area. The vertiport management platform may be a cloud based platform storing data associated with various aerial ODM stakeholders in one or more database. For example, the vertiport management platform may include a database of vertiports including information on vertiport owners/operators, economic factors related to vertiports (e.g., rate of return goals, expected/actual usage rates, etc.), number of landing and take-off spots or pads at a vertiport, air traffic requirements or restrictions at a vertiport (e.g., egress/ingress flight directions, altitude ceilings, hover restrictions, etc.), maps of vertiports and their surrounding air traffic restrictions, etc. The vertiport management platform may apply algorithms, such as machine learning algorithms, to the data associated with aerial ODM stakeholders utilizing the vertiport management platform to manage the various aerial ODM processes associated with vertiports. For example, the vertiport management platform may apply machine learning algorithms to identify patterns in historical vertiport operations data and may use those patterns to predict future vertiport capacity in various scenarios. The vertiport management platform may enable vertiport owners/operators to maximize throughput and fee collection in the operation of vertiports. The vertiport management platform may alleviate the capacity bottleneck associated with the limited number of vertiports and take-off and landing spots at those vertiports in a given area, thereby supporting aerial ODM adoption. The vertiport management platform may track aircraft in-route and outbound from vertiports, link those aircraft to passenger and/or cargo shipment demands, and dynamically assign aircraft, passengers, cargo, flight plans/routings, and vertiport take-off and landing spots (pads) together. The vertiport management platform may track interruptions and delays, such as passenger arrival delays, cargo arrival delays, maintenance delays (e.g., electric charging delays, fueling delays, etc.), pre-flight check failures, weather delays, flight interruptions (e.g., emergency landings, etc.), and any other interruptions and/or delays impacting aerial ODM, and may dynamically adjust aircraft, passenger, cargo, and/or vertiport assignments. In various embodiments, the vertiport management platform may maintain a dynamic and experience based threshold level of slack (i.e., excess capacity) at a given vertiport to enable the vertiport management platform to account for and adjust to interruptions and/or delays impacting aerial ODM services.

In various embodiments, mobility service providers (e.g., aerial and aerial/road based ODM transportation network companies) may dynamically assemble flights from a marketplace of available vertiport timeslots, coupled with matching government airspace controller (e.g., U.S. Federal Aviation Administration (FAA), European Organization for the Safety of Air Navigation (Eurocontrol), etc.) flight plans and associated services (e.g., maintenance, electric charging, etc.). Access and pricing of timeslots may be determined in the free market as brokered on a vertiport management platform according to the various embodiments, and may include spot-market, pre-contracted, and other block-purchased or priority-based arrangements. A vertiport management platform according to the various embodiments may receive inputs from passengers/customers, mobility service providers (e.g., aerial and aerial/road based ODM transportation network companies), VTOL fleet operators, government airspace controllers (e.g., U.S. Federal Aviation Administration (FAA), European Organization for the Safety of Air Navigation (Eurocontrol), etc.) that may define available flights and/or demand for flights. A vertiport management platform according to the various embodiments may receive inputs from vertiport owner/operators (including inputs from equipment, systems, and personnel at the vertiports themselves) and definitions of various different requirements and constraints related to vertiport operations, such as electric charging, maintenance, billing, passenger/customer services, onward connections, cargo handling equipment specifications, etc., that may define both the available vertiports at any given time and the capacities of those vertiports. A vertiport management platform according to the various embodiments may use the knowledge of available flights and/or demand for flights and the knowledge of available vertiports at any given time and the capacities of those vertiports to perform various operations in support of aerial ODM, such as operations to maximize utilization of vertiports and/or flights, to create an efficient market for vertiports and/or flights, to enable seamless operations of vertiports and/or flights, to support a quality customer experience at vertiports and/or on flights, and to enable planning of future expansion of aerial ODM network capacity (e.g., placement of new vertiports, additions of aircraft, etc.).

A vertiport management platform according to the various embodiments may provide an interface to multiple different participants in aerial ODM, such as vertiport owner/operators, mobility service providers (e.g., aerial and aerial/road based ODM transportation network companies), service providers (e.g., electric charging, maintenance, fueling, passenger services (e.g., hospitality services, etc.), cargo handling services, etc.), VTOL fleet operators, etc. A vertiport management platform according to the various embodiments may provide various tools for value creation in aerial ODM networks, such as route selection tools, flight scheduling tools, dynamic market pricing tools, service purchase tools, automated aviation compliance tools, streamlined administration tools, cargo tracking tools, etc. A vertiport management platform according to the various embodiments may provide exchange operations, such as payment processing, contracted capacity services, performance ratings, etc. A vertiport management platform according to the various embodiments may provide a network of destinations, may leverage historical data on flights and/or vertiports to increase efficiency, may enable the selection of service providers, may support compliance requirements, and may streamline financial operations for aerial ODM participants. A vertiport management platform according to the various embodiments may implement contracts between the various aerial ODM participants and operate and schedule flights and other events in the aerial ODM network in compliance with those contracts. A vertiport management platform according to the various embodiments may recommend market terms for contracts between the various aerial ODM participants.

A vertiport management platform according to the various embodiments may receive routes, altitudes, and speed information for VTOL aircraft (e.g., eVTOL aircraft) from government airspace controllers (e.g., U.S. Federal Aviation Administration (FAA), European Organization for the Safety of Air Navigation (Eurocontrol), etc.) that monitor a given airspace and maintain the separation of aircraft traffic in that airspace. The vertiport management platform according to the various embodiments may coordinate and communicate upcoming ground operations at vertiports to aerial ODM participants and monitor ground operation performance. The vertiport management platform according to the various embodiments may provide bi-direction updates between air and ground status of both VTOL aircraft and vertiports.

A vertiport management platform according to the various embodiments may provide a map of all vertiports available in a given region. The vertiport management platform may assign departure and landing slots at those vertiports based on availability. The vertiport management platform may manage the dynamic market for vertiport utilization and schedule aircraft services, such as maintenance, electric charging, etc. The vertiport management platform may schedule the arrival and/or departure of aircraft from a vertiport. The vertiport management platform may provide a benchmark of ground operations performance at a vertiport. The vertiport management platform may adjust operations at a vertiport based on weather. The vertiport management platform may provide a benchmark of flight on-time performance at a vertiport. The vertiport management platform may collect and distribute landing fees for a vertiport. The vertiport management platform may control electric charging services at a vertiport. The vertiport management platform may control maintenance services at a vertiport. The vertiport management platform may control passenger services at a vertiport. The vertiport management platform may control cargo handling services at a vertiport. The vertiport management platform may support the provisioning of payables and receivables at a vertiport. The vertiport management platform may integrate with enterprise resource planning (ERP) systems, such as via application programming interfaces (APIs). The vertiport management platform may synchronize flight plans and vertiport operations. The vertiport management platform may document vertiport ground operations. The vertiport management platform may support emergency services, such as by reserving capacity at vertiports for emergencies and providing data links to first responders, etc.

A vertiport management platform according to the various embodiments may include interfaces for one or more aerial ODM participants and/or operations, including interfaces for air traffic control, interfaces for electric charging services, interfaces for mobility service providers (e.g., aerial and aerial/road based ODM transportation network companies), interfaces for vertiport onsite operations, interfaces for hyper local airspace, interfaces for national weather service providers, interfaces for maintenance providers, interfaces for government airspace regulators and controllers (e.g., U.S. Federal Aviation Administration (FAA), European Organization for the Safety of Air Navigation (Eurocontrol), etc.), interfaces for VTOL fleet operators (e.g., eVTOL fleet operators), etc.

In various embodiments, interfaces for air traffic control may enable air traffic control to provide the inbound flight picture to a vertiport management platform. In various embodiments, interfaces for air traffic control may enable aircraft pilots (or autonomous aircraft) to utilize the vertiport management platform to file and/or update flight plans manually and/or automatically. In various embodiments, interfaces for air traffic control may enable flight plans to be filed synchronously with assignments of landing and takeoff timeslots and assignments of aircraft. In various embodiments, interfaces for air traffic control may enable temporary flight restrictions (TFRs), such as exclusion areas related to air shows, etc., to be created, updated, and/or canceled, as well as noticed to aircraft, vertiports, and any other aerial ODM participants. Additionally, the vertiport management platform may respond to the TFRs and adjust flight operations in the aerial ODM network accordingly. In various embodiments, interfaces for air traffic control may enable weather based routing changes to be indicated on an area wide and/or per aircraft basis from air traffic control to the various impacted aircraft, and the vertiport management platform may respond by updating estimated times of arrival/departure and rippling the resulting changes to flight plans throughout the aerial ODM network as needed. In various embodiments, interfaces for air traffic control may enable emergency divert updates from aircraft to be passed through the vertiport management platform to air traffic control. In various embodiments, the vertiport management platform and air traffic control may exchange data via a bi-directional interface. In various embodiments, a data feed from air traffic control may be provided to the vertiport management platform with the air traffic picture, flight plans, aircraft statuses, and any other information for a given area. The vertiport management platform may make the data feed available to other aerial ODM stakeholders, such as to vertiports for management of ground operations. The data feed from air traffic control may enable the vertiport management platform to generate inbound and outbound flight pictures for vertiports and those inbound and outbound flight pictures may be provided to vertiport owner/operators and operations personnel of the takeoff and landing spots of the vertiports.

In various embodiments, a vertiport management platform may provide interfaces for electric charging services that may enable electric charging scheduling, operations status updates related to electric charging, billing and payment for electric charging services, and ERP integration for VTOL fleet operators and electric charging service providers. Vertiports may include electric charging equipment, such as electric charging charge points for one or more different electric charging services and/or one or more different aircraft configurations. In various embodiments, the vertiport management platform may store aircraft configuration data, such as make, model, fueling requirements, number of passengers, total useful load (i.e., carrying capacity), etc., and may provide that aircraft configuration data to electric charging services to enable the correct electric charging services to be prepared for and provisioned to aircraft at given vertiports. The vertiport management platform may enable VTOL fleet operators (e.g., eVTOL fleet operators) to interface with electric charging services to schedule and pay for electric charging services for aircraft.

In various embodiments, a vertiport management platform may provide interfaces for mobility service providers (e.g., aerial and aerial/road based ODM transportation network companies) that may enable flight creation, onward connection management, billing and payment for flights, and ERP integration for the mobility service providers.

In various embodiments, interfaces for vertiport onsite operations in a vertiport management platform may include interfaces to track the status of aircraft on the ground at the vertiport and the status of occupied landing/takeoff spaces at the vertiports. In various embodiments, interfaces for vertiport onsite operations in a vertiport management platform may include interfaces to track the status of cargo at the vertiports. In various embodiments, interfaces for vertiport onsite operations may enable schedules of arrivals and departures to be generated and provided to the vertiports. In various embodiments, sensors at vertiports, such as radars, lidars, cameras, or other sensors, may monitor the status of aircraft at the vertiport and/or the status of ground operations at the vertiport. Such sensors may use machine learning and/or computer analysis (e.g., machine vision, etc.) to interpret the sensor data and inform the vertiport management platform of the status of aircraft at the vertiport and/or the status of ground operations at the vertiport. The data from such sensors may be provided to the vertiport management platform and used by the vertiport management platform to track the status of aircraft on the ground at the vertiport, the status of cargo at the vertiport, and/or the status of occupied landing/takeoff spaces at the vertiports. Additionally, such data may be used to update flight plans and assignments. Further, data related to operations at the vertiport, such as maintenance (e.g., pre-flight check completion/passage/failure, etc.), electric charging (e.g., charge state, time to complete charging, etc.), passenger loading (e.g., loading complete, in process, passenger arrived, etc.), cargo loading (e.g., loading complete, in process, cargo arrived, etc.), and any other vertiport operation, may be gathered by one or more sensors or input devices (e.g., vertiport staff user input terminal, etc.) and be provided to the vertiport management platform and used by the vertiport management platform. For example, the data related to operations at the vertiport may be used by the vertiport management platform to dynamically adjust flight assignments.

In various embodiments, interfaces for hyper local airspace information may enable situational awareness of each vertiports' local airspace to be monitored by a vertiport management platform. One or more sensor inputs at a vertiport, such as radars, Lidars, cameras, barometers, wind speed monitors, etc., may enable a situational awareness of the local airspace over the vertiport and safety and operations monitoring of each vertiport. Hyper local airspace information may include information about what aircraft are ascending, descending, landing, taking off, or otherwise operating in the vicinity of a vertiport, information about weather (e.g., cloud cover, barometer pressure readings, wind speed readings, etc.). Hyper local airspace information may be provided from sensors at the vertiport itself. For example, up-ward looking radars, lidars, and/or cameras at a vertiport may gather airspace information, such as aircraft information, weather information, etc.

In various embodiments, interfaces for national weather service providers may provide one or more weather feed to be provided to a vertiport management platform. The weather feed may provide a picture of the weather over one or more vertiport. The vertiport management platform may compare current weather patterns from the weather feed to previous weather patterns stored in a database. Based on the comparison, historical impacts of weather on vertiport operations may be modeled and current vertiport operations may be adjusted proactively to account for likely weather impacts. In this manner, the vertiport management platform may get ahead of weather impacts. Additionally, weather information may be provided by local weather stations, such as remote stations on buildings, weather stations at the vertiports themselves, miniature weather sensors located near a vertiport, aircraft pilots (e.g., weather observation logs, etc.), sensors on-board aircraft, etc.

In various embodiments, a vertiport management platform may provide interfaces for maintenance providers to advertise available services at various vertiports, schedule services, billing and payment for services, and ERP integration for maintenance service providers. Vertiports may include maintenance equipment, such as hangers, tools, lifts, etc., for one or more different maintenance providers and/or one or more different aircraft configurations. In various embodiments, the vertiport management platform may store aircraft configuration data, such as make, model, fueling requirements, etc., and may provide that aircraft configuration data to maintenance providers to enable the correct maintenance services to be prepared for and provisioned to aircraft at given vertiports. The vertiport management platform may enable VTOL fleet operators (e.g., eVTOL fleet operators) to interface with maintenance providers to schedule and pay for electric charging services for aircraft.

In various embodiments, a vertiport management platform may provide interfaces for government airspace regulators and controllers (e.g., U.S. Federal Aviation Administration (FAA), European Organization for the Safety of Air Navigation (Eurocontrol), etc.) that may provide operational accountability, compliance reporting, and safety monitoring. The vertiport management platform may capture data related to all activities of aerial ODM stakeholders using the vertiport management platform and store such data. This stored data may serve effectively as a network wide "black box" enabling government airspace regulators and controllers to recreate the events before emergencies and other accidents and may provide aerial ODM stakeholders compliance and reporting services to such government airspace regulators and controllers using the stored data.

In various embodiments, a vertiport management platform may provide interfaces for VTOL fleet operators (e.g., eVTOL fleet operators) that may provide fleet status information, electric charging information, maintenance information, billing and payment processing, and ERP integration for VTOL fleet operators. In various embodiments, the vertiport management platform may receive and store aircraft configuration data, such as make, model, fueling requirements, charging requirements, cargo handling capabilities, etc., for aircraft from VTOL fleet operators. The vertiport management platform may provide interfaces for VTOL fleet operators to negotiate contracts with mobility service providers for use of aircraft and/or may enable VTOL fleet operators to receive spot bids for aircraft not currently under contract. The vertiport management platform may associate cost functions with aircraft of VTOL fleet operators, such as cost functions that account for aircraft operation costs, aircraft current location, flight time, VTOL fleet operator profit goals, etc., and may enable VTOL fleet operators to use such cost functions to automatically prepare bids for responding to flight requests on the spot flight request market. These cost functions may account for various VTOL fleet operator goals and may include price floors or other controls to ensure VTOL fleet operator profit needs are met. For example, the vertiport management platform may use VTOL fleet operator set cost functions to select from available aircraft and assign aircraft to flights to fill flight requests. Additionally, the vertiport management platform may execute contracts dynamically between vertiport operators, VTOL fleet operators, and mobility service providers to assign aircraft and vertiports to fill flight requests.

In various embodiments, a vertiport management platform may provide dynamic scheduling assignment of flights, across all sources of flights, including any and all consumer facing mobility service providers. The vertiport management platform may provide a demand picture that is a forward looking list of all flights being requested from across all VTOL (e.g., eVTOL) fleet operators. Such dynamic scheduling and demand picture provisioning may enable VTOL (e.g., eVTOL) fleet operators to maximize their operating profit for air vehicles and/or may enable vertiport owner/operators to maximize their profit on vertiport operations. The vertiport management platform may enable market making for each requested flight based on various factors, such as contracts and/or spot market bids for aircraft service. The vertiport management platform may match flight requests to air vehicles based on one or more factors, such as price and/or response time, already scheduled flights with empty seats, cargo capacity, etc. The vertiport management platform may track each aircraft and provide a real-time map of the location of each aircraft. The vertiport management platform may provide a predictive map of where all aircraft will be at times in the future to contribute to accurate and economically sound bidding for assignments of future flights. Such predictive services may enable VTOL (e.g., eVTOL) fleet operators to balance between maximizing pricing and maximizing utilization of their aircraft fleets. In various embodiments, VTOL (e.g., eVTOL) fleet operators may provide a forward view of the aircraft they will have operating at given times and in given areas to the vertiport management platform to enable a capacity picture to be generated by the platform. The operating plans for the VTOL (e.g., eVTOL) fleet operators may be both scheduled and dynamically changing, and the vertiport management platform may support both schedule types enabling VTOL (e.g., eVTOL) fleet operators to make rapid changes to the aircraft available.

In various embodiments, a vertiport management platform may provide pricing controls for VTOL (e.g., eVTOL) fleet operator flights. The vertiport management platform may set the pricing floor for aircraft to be assigned to a flight, for example based on aircraft type, operating cost structure, as well as deadhead distance for the aircraft to arrive at the pick-up vertiport. The vertiport management platform may set the pricing floors and/or bidding price functions used to dynamically match aircraft to needed flights. In various embodiments, a vertiport management platform may implement execution of contractual arrangements between fleet operators and mobility service providers for air vehicle capacity. In various embodiments, a vertiport management platform may implement spot market pricing floors and bidding rules based on distance and/or response time from an air vehicle location to a pick-up (originating) vertiport. The vertiport management platform may monitor preferences for pricing and provide economic performance data of aircraft and fleet operators. The vertiport management platform may report on the revenue per day, revenue per aircraft, operating hours, bidding/pricing performance versus the market place, destinations frequented, and/or any other information of interest to the VTOL (e.g., eVTOL) fleet operators. This may enable VTOL (e.g., eVTOL) fleet operators to track the real-time status of their aircraft and gain a detailed picture of their operations to understand the utilization of the aircraft and vertiports, understand market reactions, and understand growth and usage trends. The vertiport management platform may increase market efficiency, increase utilization, increase speed and flexibility, and improve the customer experience of aerial ODM by dynamic matching of flights and aircraft. The vertiport management platform may aggregate flights and vertiport asset data and use that data to drive higher profits for VTOL (e.g., eVTOL) fleet operators. Fees for the vertiport management platform use by VTOL (e.g., eVTOL) fleet operators may be in the form of market spread fees, flat fees, or other type fees. The real-time and historical data accumulated by the vertiport management platform may be valuable to improve VTOL (e.g., eVTOL) fleet operator performance and help to deploy capital to efficient allocations of purchases of new aircraft, as well as construction of new vertiports.

In various embodiments, a vertiport management platform may enable vertiport owners/operators to maximize operating profit by providing passengers/customers and VTOL fleet operators a map or other indication of available vertiports and a directory of services available at those vertiports. The vertiport management platform may enable vertiport owners/operators to create flights from their vertiports on an on-demand basis and may provide precision predictions of arrival and departure times augmented by historical data. The vertiport management platform may enable aircraft to purchase services, such as electric charging or other maintenance services, from vertiports. The vertiport management platform may support contracted capacity buys of vertiport landing/take-off spaces, spot market buys of landing/take-off spaces, and resale/transfer of landing/take-off spaces. In this manner, the vertiport management platform may enable vertiport owners/operators to maximize operating profit, attract flights and passengers and/or cargo, maximize utilization, up sell services, and/or adjust prices within the market. The vertiport management platform may charge a fee on service sales and landing/take-off space sales and the vertiport owners/operators may benefit from the dynamic market and historical data available on the vertiport management platform.

In various embodiments, a vertiport management platform may enable vertiport owners/operators to minimize the operational complexity of vertiport operations by maintaining a capacity buffer based on historical data, consolidating arrivals and departures on a single dashboard, and enabling flight plans to be filed. This may avoid overbooking, enable efficient operation management/staffing, enable regulation compliance, and enable system wide arrival and departure reporting. The vertiport management platform may tune the capacity buffer based on historical data. The vertiport management platform may provide a complete view of arriving and departing flights.

In various embodiments, a vertiport management platform may provide dynamic scheduling services to mobility service providers. The vertiport management platform may enable assignment of flights drawing from capacity across all vertiports and all VTOL fleet operators. The vertiport management platform may enable a market for each possible flight to be created, either through contracts and/or spot bids and clears the market by matching the flight request with an aircraft based on various factors including price and response time. The vertiport management platform may include all vertiports in an area, without restrictions as to ownership or network affiliation. The vertiport management platform may provide real-time departure and arrival information to mobility service providers for use in planning precise transfers and connections. The updates of real-time status on aircraft take-offs and landings may enable mobility service providers to predict actual arrival times to adjust their transportation pickup times. The vertiport management platform may provide a demand picture of all flights requested by transport network companies and the demand picture may be analyzed on a time and/or geographic basis. This analysis may support vertiport expansion and capacity planning. Fees for the vertiport management platform use by the mobility service providers may be in the form of market spread fees, flat fees, or other type fees. The vertiport management platform may provide on-time service, maximized operating profits, and a full multi-modal mobility solution for mobility service providers. Through the vertiport management platform mobility service providers may meet customer/passenger needs, such as competitive pricing, fast response times with rapid pick-ups, and maximized destination service.

In various embodiments, a vertiport management platform may provide aerial ODM scheduling by dynamically assigning requested flights to vertiport spots and VTOL aircraft. The vertiport management platform may continually determine vertiport capacity, continually determine requested flights and their associated requirements, and continually determine available VTOL aircraft. Based on the capacity, requested flights, and available VTOL aircraft, the vertiport management platform may assign both take-off and landing vertiport spots and VTOL aircraft to requested flights. The vertiport management platform may send the assignments to the vertiports and VTOL aircraft and may dynamically update the assignments as the capacity, requested flights, and available VTOL aircraft change before a given requested flight is completed.

In various embodiments, a vertiport management platform may manage the slack capacity at a vertiport by dynamically updating the slack capacity setting for that vertiport. The vertiport management platform may determine the capacity threshold for a vertiport based at least in part on a selected vertiport's current status and historical performance data. In response to the slack capacity of the vertiport not being within the threshold, the vertiport management platform may update the selected vertiport's slack capacity setting. The vertiport's slack capacity setting may be used in determining the vertiport's capacity which may be used by the vertiport management platform to assign both take-off and landing vertiport spots and VTOL aircraft to requested flights.

FIG. 1 is a system block diagram of an aerial ODM network 100 supported by a vertiport management platform 106 according to various embodiments. The vertiport management platform 106 may be an Internet connected (e.g., cloud based) platform tracking all operations in the aerial ODM network 100 and storing data related to all aspects of the aerial ODM network 100 operations in one or more databases.

The aerial ODM network 100 may include various vertiports 110, 111, 112, 114, and 115 all including one or more take-off and landing spots. Some vertiports may have a single take-off and landing spot, while other vertiports may have large numbers of take-off and landing spots. For example, vertiport 111 may have six spots, 105, 151, 152, 153, 154, 155, and 156. Aircraft, such as eVTOL aircraft 130, 131, 132, 133, and 134, may fly between the landing spots of the vertiports 110, 111, 112, 114, and 115 to move passengers/customers/cargo, such as passenger/customer 101 from various starting locations 162 to destinations 161 in the aerial ODM network 100. The aircraft, such as eVTOL aircraft 130, 131, 132, 133, and 134, may be autonomous, semi-autonomous, and/or pilot-controlled aircraft. The vertiport management platform 106 may include the attributes of all vertiports in the aerial ODM network 100, such as the number of take-off and landing spots and the status of those spots. For example, the vertiport management platform 106 may track that eVTOL aircraft 134 is currently in spot 155 of vertiport 111.

Mobility service providers, such as mobility service provider 140, may interface with the vertiport management platform 106 to request and/or create flights from aircraft in the aerial ODM network 100 to enable flight legs between the transport provided by their ground vehicles 121 and 123 between vertiports. As an example, a passenger 101 at a starting location 162 may request transportation from the starting location 162 to a destination 161 from a mobility service provider 140 via the user's computing device 102. The mobility service provider 140 may request a flight from the vertiport management platform 106 and may provide the starting location 162 and destination 161. The vertiport management platform 106 may review the airspace picture for the aerial ODM network 100 and based on multiple factors, such as economic factors, proximity of aircraft to vertiports, proximity of vertiports to starting location 162 and destination 161, vertiport capacity, etc., may assign aircraft 133 to fly from vertiport 110 to vertiport 112 to fulfill the flight request. The mobility service provider 140 may assign its vehicle 121 to drive the passenger/customer 101 from the starting location 162 to the vertiport 110. The aircraft 133 may arrive at the vertiport 110 to pick-up the passenger/customer 101 and fly to the vertiport 112 to disembark the passenger/customer 101. The passenger/customer 101 may be transported by the mobility service provider 140 vehicle 123 to the destination 161. The customer/passenger 101 may pay the mobility service provider 140 for the transport via vehicles 121 and 123 and aircraft 133 via his or her computing device 102. Then the mobility service provider 140 may pay the aircraft 133 and the vertiports 110 and 112 their respective fees for the flight via the vertiport management platform 106. The vertiport management platform 106 may track all such transactions and flights in the aerial ODM network 100. As another example, the mobility service provider 140 may request an overall trip from starting locations 162 to a destination 161, and the vertiport management platform 106 may optimize flight options from a variety of nearby vertiports, passing one or more options (e.g., the best option, top three options, etc.) back to the mobility service provider 140 for completion of the booking via ground transportation assignment and confirmation by the passenger/customer 101. Additionally, the passenger/customer 101 may be presented several options for vertiports and/or aircraft to use trading off between time, convenience, and/or price. Flight creation and scheduling may include reserving/holding several candidate flight plans with air traffic control until the passenger/customer 101 may be presented with and may select/confirm the flight to actually be used. While FIG. 1 is discussed in relation to examples of providing flights to passengers/customers, such as passenger/customer 101, in a similar manner cargo (e.g., packages, boxes, parts, containers, etc.) may be moved in the aerial ODM network 100 supported by the vertiport management platform 106 in place of, or in addition to, a passenger/customer 101.

Figure 2:
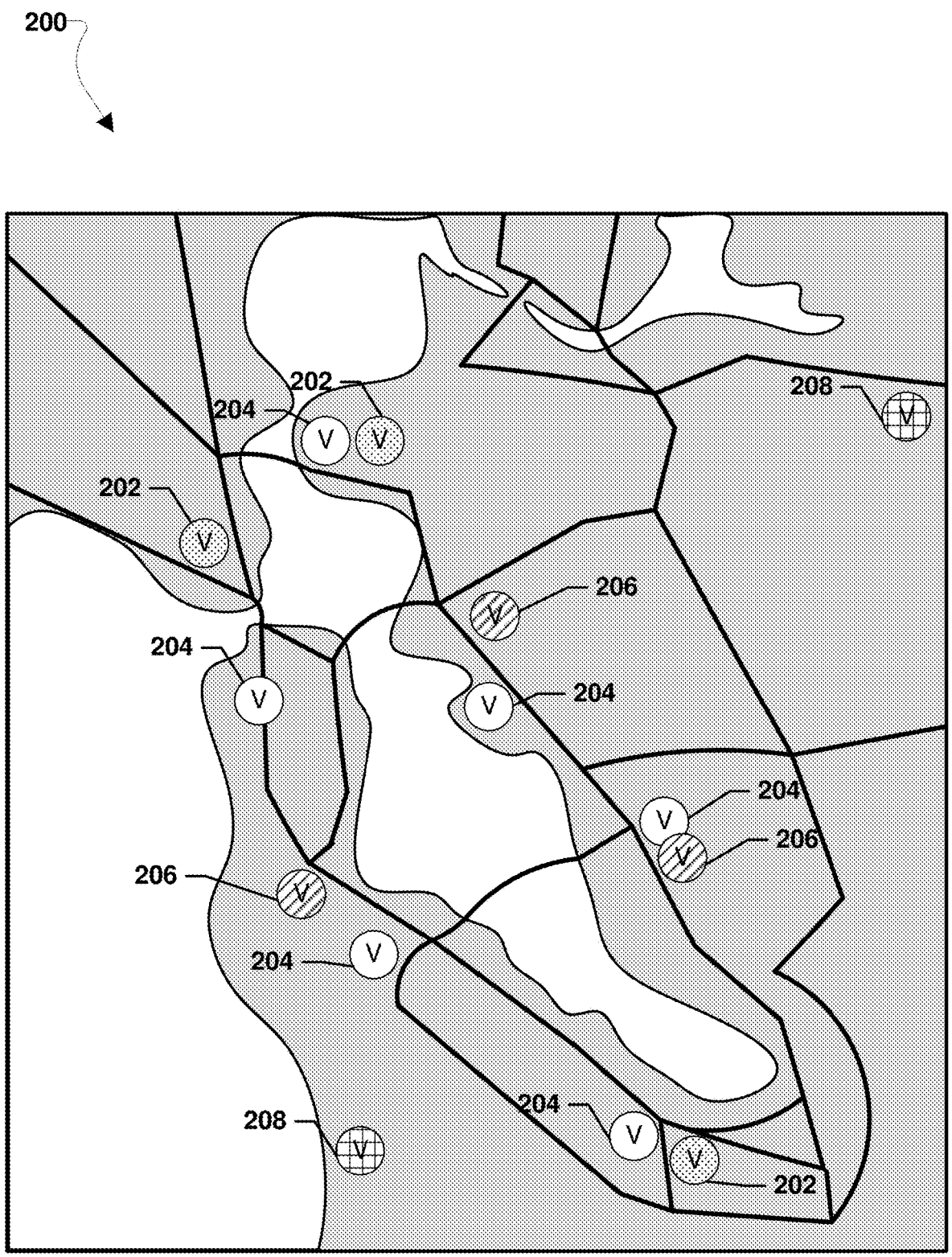
FIG. 2 is a map of vertiports managed by a vertiport management platform according to various embodiments.

FIG. 2 is a map 200 of different type vertiports 202, 204, 206, and 208 managed by a vertiport management platform, such as vertiport management platform 106, that may be located in a given area. An area may include personal private vertiports 208 that are owned by individuals and intended only for that individual's private use. These may for example be located at a passenger's home. Generally, a personal private vertiport may only be for that passenger's personal travel and/or cargo shipment/receipt. An area may include independent general use vertiports 202. These independent general use vertiports 202 may be established for use by all passengers, cargo, and/or aircraft for a fee. The independent general use vertiports 202 may be developed by capital from landowners and/or investors and may be available to any mobility service provider to utilize. Example independent general use vertiports 202 may be located on top of buildings, in open lots, etc. An area may include closed network vertiports 204. These closed network vertiports 204 may be established for use exclusively by a single mobility service provider to support its flights. An area may include public vertiports 206. Public vertiports 206 may be available to all passengers, cargo, and aircraft and may be developed by municipalities. Public vertiports 206 may be located at airports, at highway clover leafs, or on other public lands.

Figure 3:
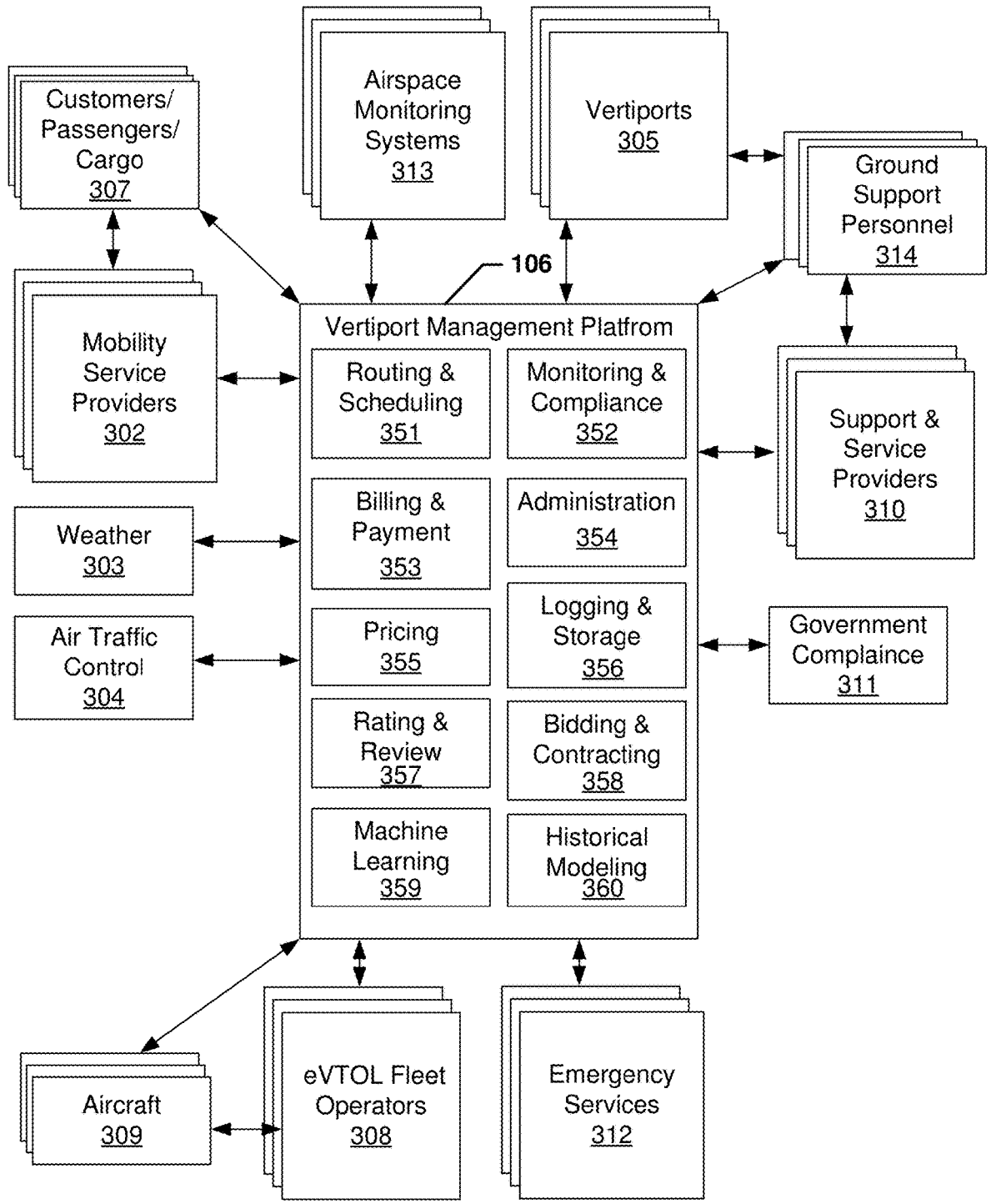
FIG. 3 is a block diagram of various interfaces to a vertiport management platform according to various embodiments.

FIG. 3 is a block diagram of various interfaces to a vertiport management platform 106. The vertiport management platform 106 may include interfaces to one or more aerial ODM participants and/or operations, including interfaces for air traffic control 304, interfaces for support and service providers 310 (e.g., electric charging services, maintenance providers, etc.), interfaces for mobility service providers 302, interfaces for vertiports 305 and ground support personnel 314, interfaces for airspace monitoring systems 313, such as hyper local airspace monitoring systems, interfaces for weather service providers 303, interfaces for government compliance monitors 311 (e.g., government airspace regulators and controllers (e.g., U.S. Federal Aviation Administration (FAA), European Organization for the Safety of Air Navigation (Eurocontrol), etc.), interfaces for eVTOL fleet operators 308, interfaces for customers/passengers/cargo 307, and interface for emergency services 312 (e.g., fire, emergency management, etc.). The various interfaces to the vertiport management platform 106 may be provided by cloud computing interfaces, such as Internet connections via wired and/or wireless connections, direct connection interfaces, proprietary interfaces, and/or any other type interfaces. The various interfaces may be unidirectional and/or bidirectional interfaces to the vertiport management platform 106.

In various embodiments, interfaces for air traffic control 304 may enable air traffic control 304 to provide the inbound flight picture to the vertiport management platform 106. In various embodiments, interfaces for air traffic control 304 may enable aircraft pilots (or autonomous aircraft control systems) to utilize the vertiport management platform 106 to file and/or update flight plans manually and/or automatically. In various embodiments, interfaces for air traffic control 304 may enable temporary flight restrictions (TFRs), such as exclusion areas related to air shows, etc., to be created, updated, and/or canceled, as well as noticed to aircraft, vertiports, and any other aerial ODM participants. In various embodiments, interfaces for air traffic control 304 may enable weather based routing changes to be indicated on an area wide and/or per aircraft basis. In various embodiments, interfaces for air traffic control 304 may enable emergency divert updates from aircraft to be passed through the vertiport management platform 106 to air traffic control 304. The vertiport management platform 106 may make the data feed from air traffic control 304 available to other aerial ODM stakeholders, such as to vertiports 305 for management of ground operations by support and service providers 310 and/or ground support personnel 314.

In various embodiments, the vertiport management platform 106 may provide interfaces for support and service providers 310, such as electric charging services that may enable electric charging scheduling, operations status updates related to electric charging, billing and payment for electric charging services, and ERP integration for VTOL fleet operators and electric charging service providers. In various embodiments, the vertiport management platform 106 may provide interfaces for support and service providers 310, such as maintenance providers (e.g., repair facilities, etc.)

In various embodiments, a vertiport management platform may provide interfaces for mobility service providers 302 that may enable flight creation, onward connection management, cargo tracking, billing and payment for flights, and ERP integration for the mobility service providers 302.

In various embodiments, interfaces for vertiports 305 may enable onsite operations to be reported to the vertiport management platform 106 to allow the tracking of the status of aircraft on the ground at the vertiport 305, the status of occupied landing/takeoff spaces at the vertiport 305, the status of cargo at the vertiport 305, etc. In various embodiments, interfaces for vertiport onsite operations may enable schedules of arrivals and departures to be generated and provided to the vertiport 305. In various embodiments, sensors at the vertiport 305, such as radars, lidars, cameras, or other sensors, may monitor the status of aircraft at the vertiport 305 and/or the status of ground operations at the vertiport 305. One or more sensor inputs at a vertiport 305, such as radars, Lidars, cameras, barometers, wind speed monitors, etc., may enable a situational awareness of the local airspace over the vertiport 305 and safety and operations monitoring of each vertiport 305 to be reported to the vertiport management platform 106. Hyper local airspace information may include information about what aircraft are ascending, descending, landing, taking off, or otherwise operating in the vicinity of a vertiport 305, information about weather (e.g., cloud cover, barometer pressure readings, wind speed readings, etc.). Hyper local airspace information may be provided from sensors at the vertiport 305 itself. For example, up-ward looking radars, lidars, and/or cameras at a vertiport may gather airspace information, such as aircraft information, weather information, etc.

In various embodiments, interfaces for weather 303 may include hyper local airspace weather information and information from national weather service providers that may provide one or more weather feed to be provided to the vertiport management platform 106.

In various embodiments, the vertiport management platform 106 may capture data related to all activities of aerial ODM stakeholders using the vertiport management platform 106 and store such data. This stored data may serve effectively as a network wide "black box" enabling government airspace regulators and controllers to recreate the events before emergencies and other accidents and may provide aerial ODM stakeholders compliance and reporting services to such government airspace regulators and controllers using the stored data. Such data may be retrieved via the government compliance interface 311.

In various embodiments, a vertiport management platform 106 may provide interfaces for eVTOL fleet operators 308 that may provide fleet status information, electric charging information, maintenance information, billing and payment processing, and ERP integration for eVTOL fleet operators 308. In various embodiments, the vertiport management platform 106 may receive and store aircraft configuration data, such as make, model, fueling requirements, passenger capability, cargo carrying capacity, weight carrying capacity, charging requirements, etc., for aircraft from eVTOL fleet operators 308. In various embodiments, the vertiport management platform may communicate with aircraft through the eVTOL fleet operators 308 or directly to the aircraft 309.

In various embodiments, the vertiport management platform 106 may include various databases and modules related to all aerial ODM operations. For example, the vertiport management platform 106 may include a routing and scheduling module 351, a monitoring and compliance module 352, a billing and payment module 353, an administration module 354, a pricing module 355, a logging and storage module 356, a rating and review module 357, a bidding and contracting module 358, a machine learning module 359, and historical modeling module 360, and well as various other modules to provide the functionality described herein.

Figure 4:
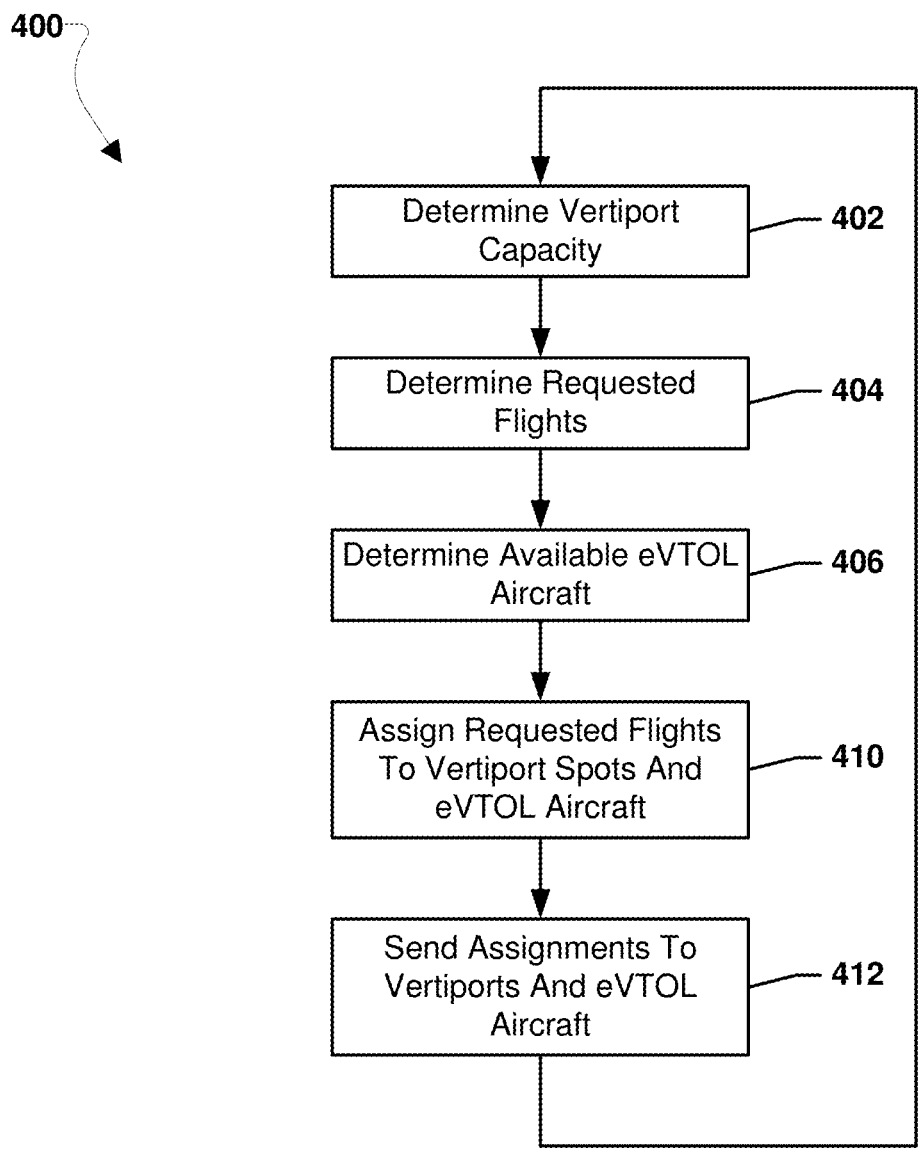
FIG. 4 is process flow diagram illustrating an embodiment method for a vertiport management platform to provide aerial ODM scheduling.

FIG. 4 illustrates an embodiment method 400 for a vertiport management platform to provide aerial ODM scheduling. In various embodiments, the operations of method 400 may be performed by a processor of a vertiport management platform, such as vertiport management platform 106.

In block 402, the vertiport management platform may determine vertiport capacity. Vertiport capacity may be determined based on attributes of vertiports in a given area, such as the number of landing and take-off spots at the vertiports, the current status of the vertiports and the landing and take-off spots at the vertiports (e.g., operational, off-line, in-use, reserved, etc.), the type of vertiport (e.g., private, public, etc.), or any other vertiport attributes. Additionally, the historical performance data for vertiports may be used to determine vertiport capacity. For example, a vertiport with historically high throughput may be determined to have a higher capacity than vertiports with lower throughput. Further, a vertiport slack capacity setting may be used to determine vertiport capacity. In various embodiments, the vertiport management platform may maintain a threshold level of slack (i.e., excess capacity) at a given vertiport to enable the vertiport management platform to account for and adjust to interruptions and/or delays impacting aerial ODM services. As an example, a vertiport slack capacity setting may be a number of vertiport spots that should remain unscheduled at a vertiport to support contingencies, such as emergency take-offs and landings, aircraft failures, passenger arrival delays at the vertiport, loading delays, etc. Vertiport capacity may be determined based on inputs from vertiport owner/operators and other aerial ODM stakeholders provided by one or more interfaces to the vertiport management platform.

In block 404, the vertiport management platform may determine requested flights. Requested flights may be flight requests for transportation of one or more passengers and/or one or more pieces of cargo from a starting location, such as a starting vertiport, starting address, etc. to a destination location, such as an arrival vertiport, arrival address, etc. Requested flights may be received by a vertiport management platform from transport network companies and may be generated in response to requests for transport, such as passengers requesting transport, shippers requesting transport of cargo, etc. For example, a passenger may request transport between two locations from a mobility service provider, such as Uber®, and the mobility service provider may select to use a flight for all or a portion of the transport. As another example, a shipper may request transport of a piece of cargo between two locations from a mobility service provider (e.g., Amazon® requesting delivery of a package), and the mobility service provider may select to use a flight for all or a portion of the transport. The mobility service provider may generate a flight request for all or portion of the transport requested by the passenger and/or for the cargo and may send the flight request to the vertiport management platform. The vertiport management platform may determine which vertiports (e.g., a starting vertiport and arrival vertiport) to use for the transport. Alternatively, the mobility service provider may select the starting vertiport and/or arrival vertiport.

In block 406, the vertiport management platform may determine available eVTOL aircraft. Available eVTOL aircraft may be determined based on eVTOL statuses and locations provided to the vertiport management system from eVTOL fleet operators. Available eVTOL aircraft may be aircraft currently in a certain geographic area or aircraft scheduled to be in a geographic area within a given time period.

In block 410, the vertiport management platform may assign requested flights to vertiport spots and eVTOL aircraft. The vertiport management platform may track aircraft in-route and outbound from vertiports, link those aircraft to passenger/cargo demands, and dynamically assign aircraft, passengers, cargo, and/or vertiport take-off and landing spots (pads) together. The vertiport management platform may track interruptions and delays, such as passenger arrival delays, cargo arrival delays, maintenance delays, pre-flight check failures, weather delays, flight interruptions (e.g., emergency landings, etc.), and any other interruptions and/or delays impacting aerial ODM, and may dynamically adjust aircraft, passenger, cargo, and/or vertiport assignments. The vertiport management platform may assign departure and landing slots at those vertiports based on availability of aircraft and/or vertiport landing slots. In various embodiments, the vertiport management platform may use VTOL fleet operator set cost functions to select from available aircraft and assign aircraft to flights to fill flight requests. Additionally, the vertiport management platform may execute contracts dynamically between vertiport operators, VTOL fleet operators, and mobility service providers to assign aircraft and vertiports to fill flight requests. In various embodiments, the vertiport management system may use machine learning algorithms to assign aircraft and vertiport slots to flight requests based on historical performance data related to aircraft and/or vertiports. The vertiport management platform may assign aircraft and/or vertiports based at least in part on reputation related rankings, such as customer reviews. In various embodiments, the vertiport management platform may enable assignment of flights drawing from capacity across all vertiports and all VTOL fleet operators. In various embodiments, the vertiport management platform may report to and/or query air traffic control as part of assigning requested flights to vertiport spots and eVTOL aircraft. The reporting to/querying of air traffic control may enable flight plans to be requested and/or approved for the assigned eVTOL aircraft and vertiport spots. As one example, the vertiport management platform may send a desired takeoff time and location and desired arrival location (and optionally arrival time) to air traffic control, and air traffic control may return possible flight plans/routings and estimated times of departure/arrival matching the vertiports and aircraft designated by the vertiport management platform.

In block 412, the vertiport management platform may send the assignments to the vertiports and eVTOL aircraft. For example, the vertiport management platform may send a notification to the mobility service provider originating a flight request including such information as the aircraft identifier of the aircraft assigned to make the flight, the identifiers of both the starting and ending vertiports to be used for the flight, estimates of the arrival and departure times for the aircraft assigned to the flight at the assigned take-off spot at the starting vertiport, estimates of the arrival times for the aircraft assigned to the flight at the assigned landing spot at the ending vertiport, estimated costs for the flight, etc. As an example, the vertiport management platform may send a notification to each of the starting and ending vertiports to be used for a flight including such information as the aircraft identifier of the aircraft assigned to make the flight, the identifiers of both the starting and ending vertiports to be used for the flight, estimates of the arrival and departure times for the aircraft assigned to the flight at the assigned take-off spot at the starting vertiport, estimates of the arrival times for the aircraft assigned to the flight at the assigned landing spot at the ending vertiport, identities of the passengers taking the flight, services to be rendered to the passengers and/or aircraft at the vertiports, indications of cargo to be loaded for the flight, fees to be earned for the flight, etc. As another example, the vertiport management platform may send a notification to the aircraft assigned for a flight including such information as the identifiers of both the starting and ending vertiports to be used for the flight, estimates of the arrival and departure times for the aircraft assigned to the flight at the assigned take-off sport at the starting vertiport, estimates of the arrival times for the aircraft assigned to the flight at the assigned landing spot at the ending vertiport, identities of the passengers taking the flight, indications of cargo to be loaded for the flight, fees to be earned for the flight, a route map for the flight, approved flight plan for the flight, etc.

The operations of method 400 may be performed continually and dynamically by the vertiport management platform, and as assignments are generated and sent the method may proceed to block 402 and continually determine vertiport capacity to update and/or assign requested flights.

Figure 5:
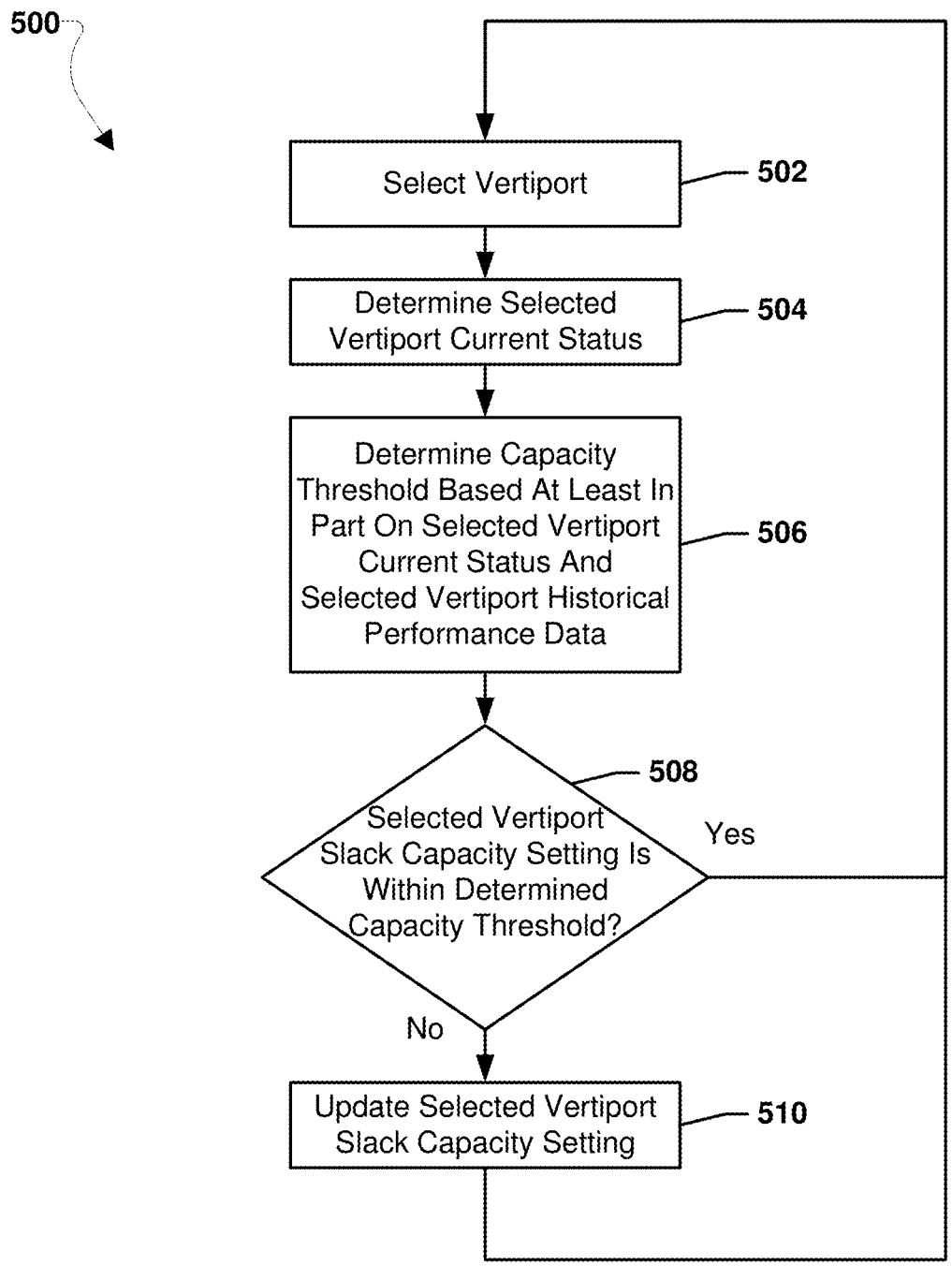
FIG. 5 is process flow diagram illustrating an embodiment method for a vertiport management platform to manage the slack capacity at a vertiport.

FIG. 5 illustrates an embodiment method 500 for a vertiport management platform to manage the slack capacity at a vertiport. In various embodiments, the operations of method 500 may be performed by a processor of a vertiport management platform, such as vertiport management platform 106. In various embodiments, the operations of method 500 may be performed in conjunction with the operations of method 400 described with reference to FIG. 4. In block 502, the vertiport management platform may select a vertiport. In block 504, the vertiport management platform may determine the selected vertiport current status. The current status of the vertiport may be determined based on one or more inputs from the vertiport, such as sensor inputs, aircraft reporting from the vertiport, vertiport staff inputs, electric charging equipment inputs, maintenance service inputs, weather inputs, etc. The current status of the vertiport may reflect various states of the vertiport and its associated take-off and landing spots, such as the number of functioning spots, the status of those spots (e.g., free, in-use, scheduled, etc.), etc.

In block 506, the vertiport management platform may determine a capacity threshold based at least in part on the selected vertiport current status and selected vertiport historical performance data. The capacity threshold may be threshold may be a window of slack (i.e., excess capacity) at the selected vertiport likely to enable the vertiport to handle interruptions and/or delays likely in aerial ODM services without impacting the ability to meet minimum throughput goals.

In determination block 508, the vertiport management platform may determine whether the selected vertiport slack capacity setting is within the determined capacity threshold. The vertiport management platform may compare a current vertiport slack capacity setting for the vertiport to the determined threshold to determine whether the selected vertiport slack capacity setting is within the determined capacity threshold. In response to determining that the slack capacity setting is within the threshold (i.e., determination block 508="Yes"), the vertiport management platform may select a next vertiport in block 502.

In response to determining that the selected vertiport slack capacity setting is not within the determined capacity threshold (i.e., determination block 510="No"), the vertiport management platform may update the selected vertiport slack capacity setting in block 510. For example, the vertiport management platform may raise the slack capacity setting to a value above the threshold. The vertiport management platform may select a next vertiport in block 502.

The operations of method 500 may be performed continually and dynamically by the vertiport management platform, and slack capacity at vertiports may be continually and dynamically adjusted by updating the slack capacity setting as the vertiport current status and vertiport historical performance data change.

Figure 6:
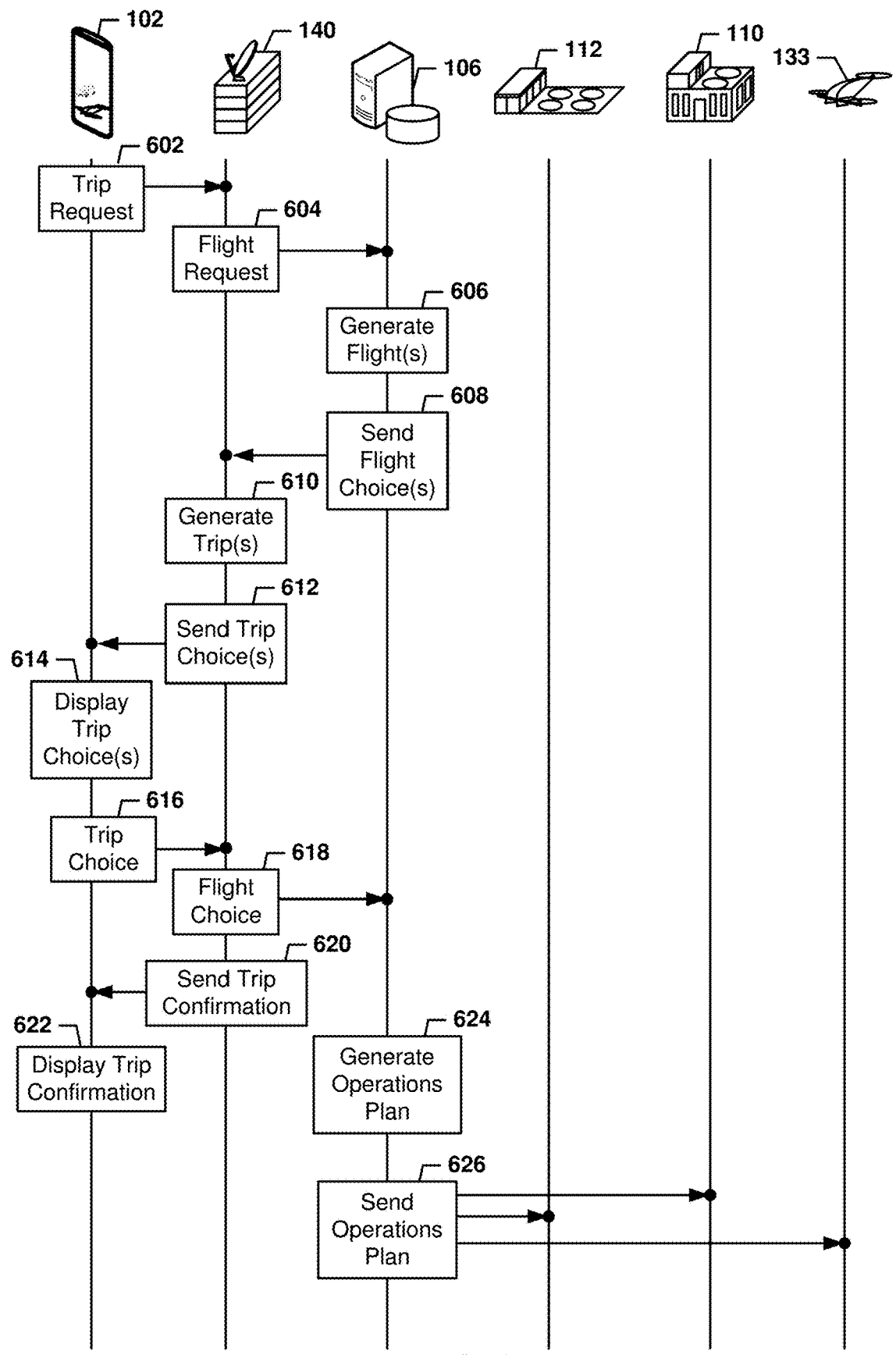
FIG. 6 is a call flow diagram illustrating various embodiment operations performed by aerial ODM stakeholders to schedule a trip including a flight.

FIG. 6 is a call flow diagram illustrating various embodiment operations performed by a processor of a vertiport management platform and processors of devices of other aerial ODM stakeholders to schedule a trip including a flight. In various embodiments, the operations illustrated in FIG. 6 may be performed by processors of the vertiport management platform 106, the mobility service provider 140, the eVTOL aircraft 133, the user's computing device 102, the vertiport 112, and the vertiport 110 as described above with reference to FIG. 1.

A user may interact with an application running on the processor of the user's computing device 102 to request a trip from a starting destination to an arrival destination, such as a trip between two addresses, a trip between a user's current location and an address, a trip to move cargo from one address to another, etc. Based on the user inputs, the processor of the user's computing device 102 may generate a trip request and send the trip request to the processor of the mobility service provider 140 in block 602. The trip request may indicate the user's desired starting and arrival destination, the user's current location, the number of passengers and/or pieces of cargo, estimated weights of passengers and/or cargo, bags or other gear, etc.

The processor of the mobility service provider 140 may determine that a flight portion may be suitable for use to fulfill all or a portion of the requested trip, and in block 604 the processor of the mobility service provider 140 may send a flight request to the processor of the vertiport management platform 106. The flight request may include information related to the requested trip, such as the desired starting and arrival destination, the user's current location, the number of passengers and/or pieces of cargo, estimated weights of passengers and/or cargo, bags or other gear, etc.

The processor of the vertiport management platform 106 may generate one or more flight plans based on the flight request in block 606. The processor of the vertiport management platform 106 may determine nearby vertiports to the desired starting destination and/or the desired arrival destination, may determine ground travel times from those vertiports to the user's current location, desired starting destination, and/or desired arrival destination, may determine the available aircraft and the attributes of those aircraft, may determine contract requirements between the vertiports, aircraft fleet operators, and/or vertiport owner/operators, and/or may determine other information enabling the processor of the vertiport management platform 106 to generate the one or more flight plans. Information considered by the processor of the vertiport management platform 106 may include departure point vertiport and arrival point vertiport locations, ground travel times, available timeslots at the vertiports, contracts between the departure point and/or arrival point vertiports and the mobility service provider, cargo handling capabilities of the departure point and/or arrival point vertiports, contracts between the mobility service provider and aircraft fleet operators, times until aircraft become available, distance between the aircraft and the departure point vertiports, aircraft specifications (e.g., type, carrying capacity, speed, etc.), etc. Additionally, the processor of the vertiport management platform 106 may determine dynamic spot pricing associated with the aircraft and vertiports in generating the flights.

The processor of the vertiport management platform 106 may generate one or more flight plans to fulfill the flight request and each flight plan may include an assigned departure point vertiport, an assigned arrival point vertiport, an assigned aircraft, estimated departure and arrival times for the aircraft, and a price for the flight (e.g., based on the aircraft and vertiport pricing determinations for that flight). In some embodiments, the processor of the vertiport management platform 106 may generate and send flight plan requests for all or a portion of the one or more generated flights to air traffic control and may receive routed flight plans for the one or more generated flights. In some embodiments, these flight plans may be place-holder flight plans or may be flight plans that may be canceled if not used.

In block 608 the processor of the vertiport management platform 106 may send one or more flight choices to the processor of the mobility service provider 140. The one or more flight choices may be indications of the one or more generated flight plans, and may indicate an assigned departure point vertiport, an assigned arrival point vertiport, an assigned aircraft, estimated departure and arrival times for the aircraft, and a price for each generated flight plan.

In block 610 the processor of the mobility service provider 140 may generate one or more trips based on all or a portion of the one or more flight plan choices. The one or more trips may be trips including at least a portion of the one or more flights used to get the user and/or the user's cargo from his or her desired starting location to the desired arrival destination. The generated trips may include overall costs to the user, estimated total trip times, etc. In some embodiments, the trips may also include planning or coordination with other services for the ground segments (e.g., taxi or car services) from the desired starting location to the departure point vertiport and from the destination vertiport to the ultimate destination. The processor of the mobility service provider 140 may send the one or more trip choices to the processor of the user's computing device 102 in block 612, and the processor of the user's computing device 102 may display the trip choices in block 614.

The user may select one of the displayed trip choices and the processor of the user's computing device 102 may send the trip choice to the processor of the mobility service provider 140 in block 616. The processor of the mobility service provider 140 may determine the flight associated with the chosen trip and the processor of the mobility service provider 140 may send the flight choice to the processor of the vertiport management platform 106 in block 618.

In block 620 the processor of the mobility service provider 140 may send a trip confirmation to the processor of the user's computing device 102, and the processor of the user's computing device 102 may display the trip confirmation in block 622.

The processor of the vertiport management platform 106 may generate an operations plan based on the chosen flight in block 624. The operations plan may indicate the selected aircraft, the selected departure vertiport, the selected arrival vertiport, the number of passengers and/or pieces of cargo, the estimated weight of passengers and/or cargo, and bags or other gear, the estimated departure time, the estimated arrival time, the air traffic control flight plan information, and/or any other information that may be appropriate to enable the aircraft and vertiports to support the chosen flight. For example, the eVTOL aircraft 133 may be selected for the chosen flight, the vertiport 112 may be the departure vertiport, and the vertiport 110 may be the arrival vertiport for the chosen flight that is all or a portion of the user's chosen trip. The operations plan may also include arrangements or coordination with other services for the ground travel segments (e.g., taxi or car services) at either end of the flight plan.

In block 626 the processor of the vertiport management platform 106 may send the operations plan to the processors of the eVTOL aircraft 133, the vertiport 112, and the vertiport 110. The operations plan may be the same for each of the eVTOL aircraft 133, the vertiport 112, and the vertiport 110 or may be tailored to the needs of each of the eVTOL aircraft 133, the vertiport 112, and the vertiport 110 based on the intended recipient. Upon receipt of the operations plan the eVTOL aircraft 133, the vertiport 112, and the vertiport 110 may execute the operations plan to carry out the flight and trip for the user and/or the user's cargo. In some embodiments, the processor of the vertiport management platform 106 may also send portions of the operations plan to service providers for the ground travel segments at either end of the flight plan.

Figure 7:
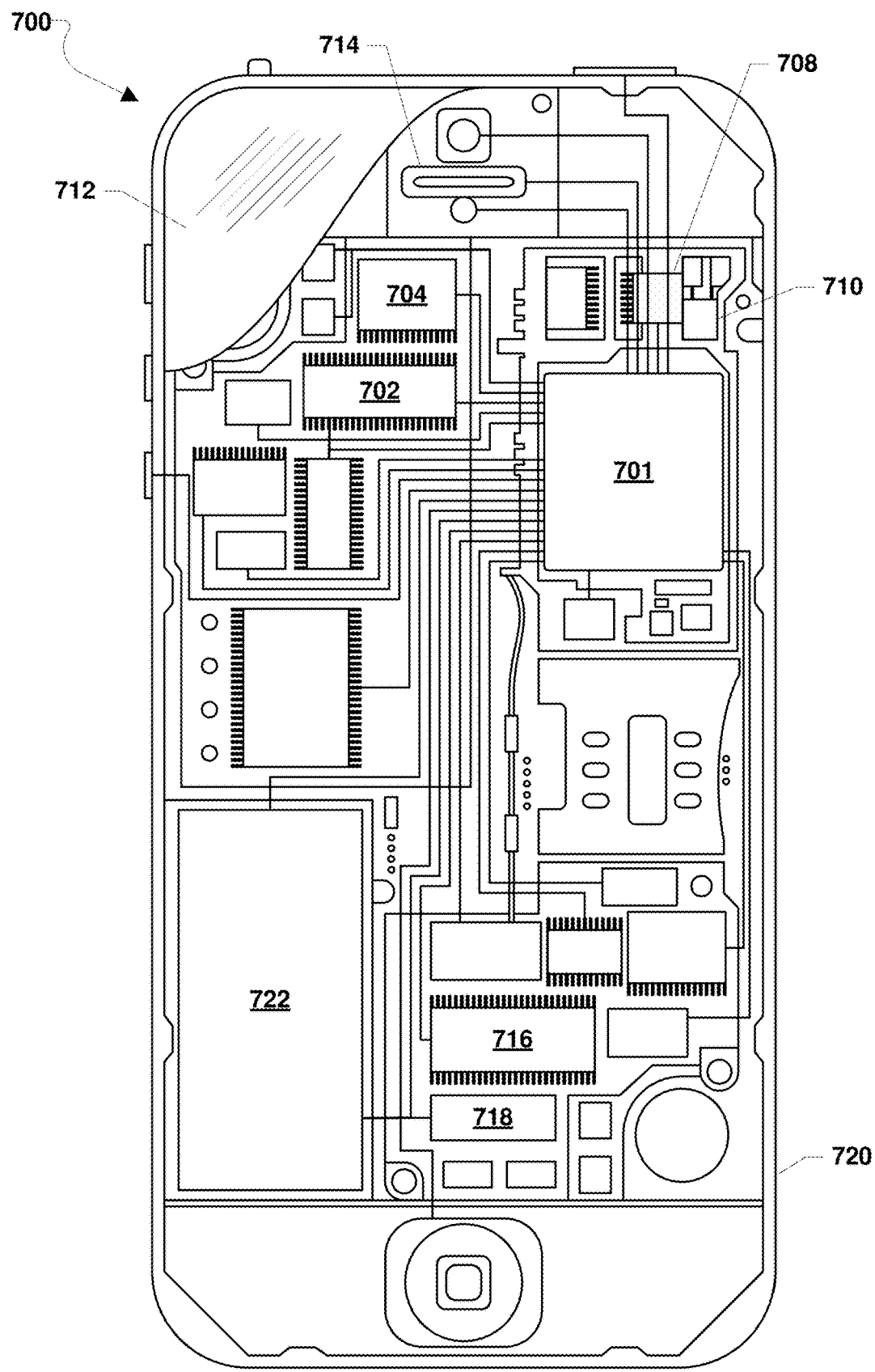
FIG. 7 is a component diagram of an example computing device suitable for use with the various embodiments.

The various embodiments (including, but not limited to, embodiments discussed above with reference to FIGS. 1-6) may be implemented in any of a variety of the computing devices (e.g., mobile devices), an example of which is illustrated in FIG. 7. For example, the mobile device 700 may include a processor 701 coupled to a touch screen controller 704 and an internal memory 702. The processor 701 may be one or more multicore integrated circuits (ICs) designated for general or specific processing tasks. The internal memory 702 may be volatile or non-volatile memory, and may also be secure and/or encrypted memory, or unsecure and/or unencrypted memory, or any combination thereof. The touch screen controller 704 and the processor 701 may also be coupled to a touch screen panel 712, such as a resistive-sensing touch screen, capacitive-sensing touch screen, infrared sensing touch screen, etc. The mobile device 700 may have one or more radio signal transceivers 708 (e.g., Peanut®, Bluetooth®, Zigbee®, Wi-Fi, RF, cellular (e.g., CDMA, TDMA, GSM, PCS, 3G, 4G, LTE, etc.), etc.) and antennae 710, for sending and receiving, coupled to each other and/or to the processor 701. The transceivers 708 and antennae 710 may be used with the above-mentioned circuitry to implement the various wireless transmission protocol stacks and interfaces. The mobile device 700 may include a cellular network wireless modem chip 716 that enables communication via a cellular network and is coupled to the processor. The mobile device 700 may include a peripheral device connection interface 718 coupled to the processor 701. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown). The mobile device 700 may also include speakers 714 for providing audio outputs. The mobile device 700 may also include a housing 720, constructed of a plastic, metal, or a combination of materials, for containing all or some of the components discussed herein. The mobile device 700 may include a power source 722 coupled to the processor 701, such as a disposable or rechargeable battery. The rechargeable battery may also be coupled to the peripheral device connection port to receive a charging current from a source external to the mobile device 700.

Figure 8:
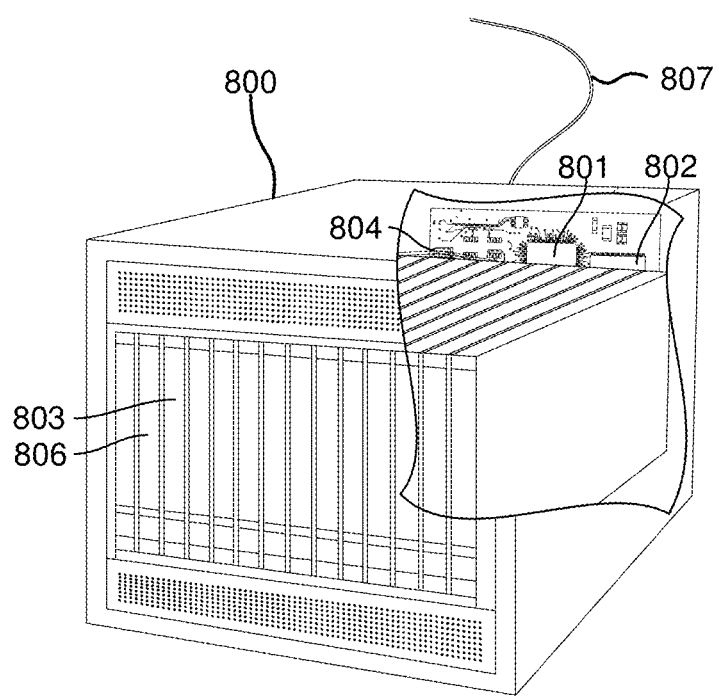
FIG. 8 is a component diagram of an example server suitable for use with the various embodiments.

The various embodiments (including, but not limited to, embodiments discussed above with reference to FIGS. 1-6) may also be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 804. The server 800 may also include a floppy disc drive, compact disc (CD) or DVD disc drive 806 coupled to the processor 801. The server 800 may also include one or more network transceivers 803, such as a network access port, coupled to the processor 801 for establishing network interface connections with a communication network 807, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 701 and 801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 701 and 801. The processors 701 and 801 may include internal memory sufficient to store the application software instructions. In many devices the internal memory may be a volatile or nonvolatile memory, such as flash memory, or a mixture of both. For the purposes of this description, a general reference to memory refers to memory accessible by the processors 701 and 801 including internal memory or removable memory plugged into the device and memory within the processors 701 and 801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for aerial on-demand mobility (ODM) scheduling of electric propelled aircraft, comprising:
receiving, in a processor of a vertiport management platform computing device, sensor data from sensors at one or more vertiports, wherein the sensor data comprises real-time local airspace information;
assigning, in the processor of the vertiport management platform computing device, one or more requested flights to one or more vertiport spots of the one or more vertiports and selected ones of one or more available electric propelled aircraft, wherein the assigning is based at least in part on the real-time local airspace information; and
sending, by the processor of the vertiport management platform computing device, the assignments to each respective one of the one or more vertiports and one or more available electric propelled aircraft.

2. The method of claim 1, further comprising:
determining, in the processor of the vertiport management platform computing device, vertiport capacity for the one or more vertiports based at least in part on a slack capacity setting for the vertiport.

3. The method of claim 2, wherein the slack capacity setting is updated based on a capacity threshold determined based at least in part on a vertiport current status and vertiport historical performance data.

4. The method of claim 3, wherein the vertiport current status is based on the sensor data.

5. The method of claim 1, wherein the sensor data is generated by one or more of a radar, a lidar, a camera, a weather sensor, or an electric charging sensor.

6. The method of claim 1, further comprising:
determining, in the processor of the vertiport management platform computing device, the one or more requested flights based at least in part on requested flight information from one or more mobility service providers.

7. The method of claim 1, wherein the available electric propelled aircraft are electric vertical take-off and landing (eVTOL) aircraft, the method further comprising:
determining, in the processor of the vertiport management platform computing device, the one or more available eVTOL aircraft based at least in part on available eVTOL aircraft information from aircraft fleet operators.

8. The method of claim 7, further comprising:
filing, by the processor of the vertiport management platform computing device, flight plans with a government airspace controller reflecting the assignments to each respective one of the one or more vertiports and one or more available eVTOL aircraft.

9. The method of claim 1, wherein the one or more requested flights are flights for one or more passengers or one or more pieces of cargo.

10. A vertiport management platform computing device, comprising:
a processor configured with processor-executable instructions to perform operations comprising:
receiving sensor data from sensors at one or more vertiports, wherein the sensor data comprises real-time local airspace information;
assigning one or more requested flights to one or more vertiport spots of the one or more vertiports and selected ones of one or more available electric propelled aircraft,
wherein the assigning is based at least in part on the real-time local airspace information; and
sending the assignments to each respective one of the one or more vertiports and one or more available electric propelled aircraft.

11. The vertiport management platform computing device of claim 10, wherein the processor is configured with processor-executable instructions to perform operations further comprising:
determining vertiport capacity for the one or more vertiports based at least in part on a slack capacity setting for the vertiport.

12. The vertiport management platform computing device of claim 11, wherein the processor is configured with processor-executable instructions to perform operations such that the slack capacity setting is updated based on a capacity threshold determined based at least in part on a vertiport current status and vertiport historical performance data.

13. The vertiport management platform computing device of claim 12, wherein the processor is configured with processor-executable instructions to perform operations such that the vertiport current status is based on the sensor data.

14. The vertiport management platform computing device of claim 10, wherein the processor is configured with processor-executable instructions to perform operations such that the sensor data is generated by one or more of a radar, a lidar, a camera, a weather sensor, or an electric charging sensor.

15. The vertiport management platform computing device of claim 10, wherein the processor is configured with processor-executable instructions to perform operations further comprising:
determining the one or more requested flights based at least in part on requested flight information from one or more mobility service providers.

16. The vertiport management platform computing device of claim 10, wherein:
the processor is configured with processor-executable instructions to perform operations such that the available electric propelled aircraft are electric vertical take-off and landing (eVTOL) aircraft; and
the processor is configured with processor-executable instructions to perform operations further comprising determining the one or more available eVTOL aircraft based at least in part on available eVTOL aircraft information from aircraft fleet operators.

17. The vertiport management platform computing device of claim 10, wherein the processor is configured with processor-executable instructions to perform operations further comprising:
filing flight plans with a government airspace controller reflecting the assignments to each respective one of the one or more vertiports and one or more available eVTOL aircraft.

18. The vertiport management platform computing device of claim 10, wherein the processor is configured with processor-executable instructions to perform operations such that the one or more requested flights are flights for one or more passengers and/or one or more pieces of cargo.

19. A non-transitory computer-readable media having stored thereon processor-executable instructions configured to cause a vertiport management platform computing device to perform operations comprising:
receiving sensor data from sensors at one or more vertiports, wherein the sensor data comprises real-time local airspace information;
assigning one or more requested flights to one or more vertiport spots of the one or more vertiports and selected ones of one or more available electric propelled aircraft; and
sending the assignments to each respective one of the one or more vertiports and one or more available electric propelled aircraft,
wherein the stored processor-executable instructions are configured to cause a processor to perform operations such that the assigning is based at least in part on the real-time local airspace information.

20. The non-transitory computer-readable media of claim 19, wherein the stored processor-executable instructions are configured to cause a vertiport management platform computing device to perform operations such that the one or more requested flights are flights for one or more passengers and/or one or more pieces of cargo.

* * * * *